United States Patent

[11] 3,633,037

[72] Inventor Peter H. Langenbeck
 Norwalk, Conn.
[21] Appl. No. 866,587
[22] Filed Oct. 15, 1969
[45] Patented Jan. 4, 1972
[73] Assignee The Perkin-Elmer Corporation
 Norwalk, Conn.

[54] METHOD AND APPARATUS FOR OBSERVING, DETECTING AND CORRECTING PERIODIC STRUCTURES IN A MOVING WEB
11 Claims, 12 Drawing Figs.

[52] U.S. Cl. ................................................. 250/219WE,
 26/51.5, 250/219 F, 356/199
[51] Int. Cl. .......................................................... G01n 21/30
[50] Field of Search ............................................ 356/199,
 200, 237, 238, 239; 250/219 WE, 219 F, 219 FR;
 26/51.5

[56] References Cited
UNITED STATES PATENTS

| | | | |
|---|---|---|---|
| 2,106,611 | 1/1938 | La Pierre | 250/219 WE |
| 2,196,893 | 4/1940 | Berry | 250/219 WE |
| 2,587,224 | 2/1952 | Robertson | 250/219 WE |
| 2,972,794 | 2/1961 | Saul | 250/219 WE |
| 3,077,656 | 2/1963 | Mahlo | 26/51.5 |
| 3,135,867 | 6/1964 | Daneff | 250/219 WE |
| 3,169,193 | 2/1965 | Strang | 250/219 WE |

Primary Examiner—Archie R. Borchelt
Assistant Examiner—D. C. Nelms
Attorney—Edward R. Hyde, Jr.

ABSTRACT: The diffraction pattern, produced by the periodic structure of a moving web is stationary. Characteristics of the periodic structure may be observed in the diffraction pattern. Deviations from a norm of a characteristic of the periodic structure are detected by imaging the diffraction pattern on a mask which is a matched filter for the characteristic. In a specific application the periodic structure is the weft of a moving cloth web, the characteristic is weft alignment, and the matched filter mask is a slit. In order to obtain an alternating current output signal, the cloth is illuminated by an oscillating slit of monochromatic light. Misalignments of the weft produce rotations in the diffraction image which may be detected by means of a pair of photodetectors located behind a slit in the plane of the diffraction image. As in the prior art a plurality of such weft misalignment detectors may be located across the moving cloth web and the angular deviations of the weft at each detector compared to produce a control signal for controlling existing automatic devices for making weft misalignment corrections.

In an alternative embodiment, relative rotation between the diffraction image and a slit produces a peak output from a photodetector when the slit is aligned with a linear pattern in the diffraction image. The output of a pulse generator driven in synchronism with the slit or image is counted from an initial reference position until the peak is attained to provide a digital output of the angular orientation of the pattern.

In another embodiment of the invention, the detector takes the form of a photochromic sheet illuminated by an ultraviolet diffraction pattern and collecting optics focusing the ultraviolet radiation passing through the photochromic sheet upon a photodetector. A perfect moving web will produce a stationary diffraction pattern forming an opaque mask in the photochromic sheet and substantially no ultraviolet light will fall on the photodetector. Short term deviations from normal will cause diffracted light to pass through the transparent areas of the photochromic material producing a signal at the photodetector. The detector may also be illuminated with infrared radiation which tends to bleach it.

The frequency of the periodicity of the moving web may be detected by combining diffracted light with a reference beam of light from the same source of illumination or a source of illumination coherent therewith to thereby produce a beat amplitude at a photodetector in synchronism with the passage of the periodic structure.

PATENTED JAN 4 1972   3,633,037
SHEET 1 OF 4
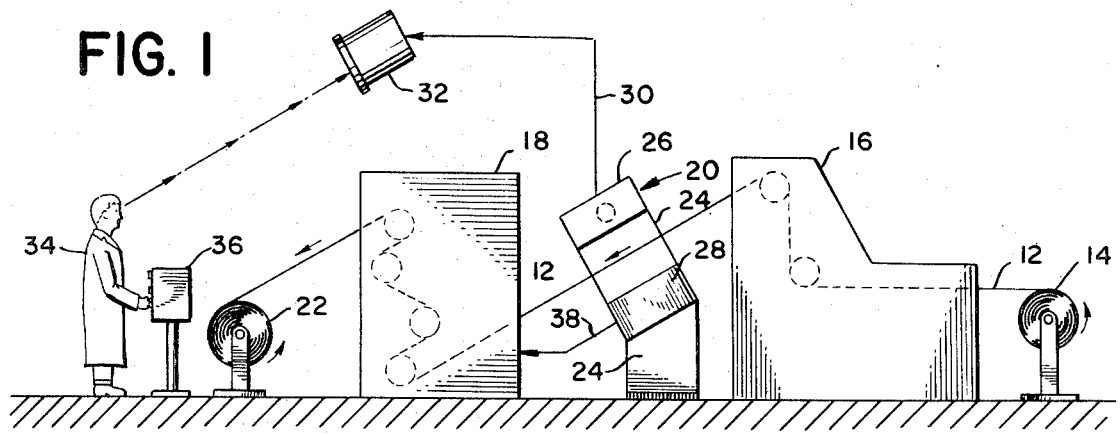
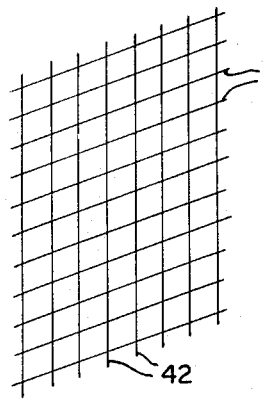
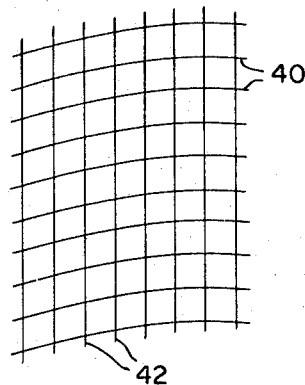
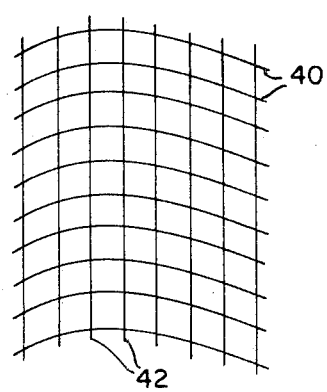
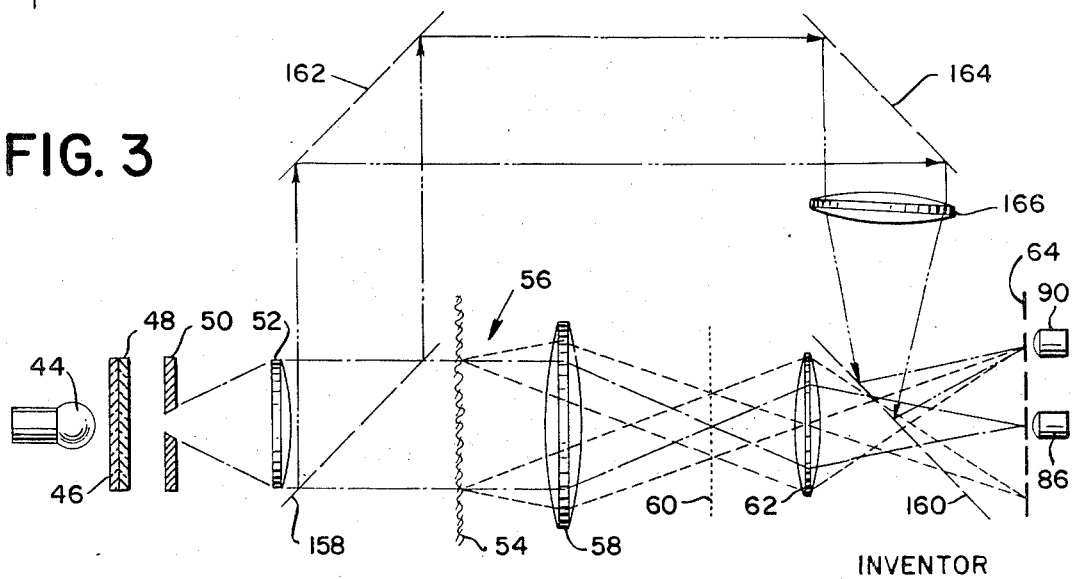
INVENTOR
PETER H. LANGENBECK
BY  Edward R. Hyde
EDWARD R. HYDE
ATTORNEY

PATENTED JAN 4 1972

METHOD AND APPARATUS FOR OBSERVING, DETECTING AND CORRECTING PERIODIC STRUCTURES IN A MOVING WEB

SUMMARY OF THE INVENTION

This invention relates to the observation of, detection of deviations, and correction of deviations, in periodic structures of moving webs, particularly textile fabrics. The invention is based upon my observation that the diffraction pattern formed by a moving web having a periodic structure is stationary if the periodic structure is perfect. Thus deviations in said periodic structure from a norm may be observed as temporal changes in the diffraction pattern. The deviation may be removed and a control signal generated for controlling apparatus to correct such deviations.

During weaving and processing, textile fabrics become distorted and deformed. Usually the warp threads stay aligned parallel to the line of motion in the processing machinery. However, the weft or cross threads often become skewed and bowed. Many prior art devices have been proposed for automatically detecting and correcting weft misalignment. However, this is not an easy matter especially when one realizes that the fabric is typically moving at a rate of 100 yards per minute through the processing machinery and the apparatus is subjected to the deleterious effects of lint and various corrosive and caustic processing chemicals.

Commercial prior art weft detectors are based upon differential thread counting. In these instruments the weft threads are counted at a plurality of stations located across the web. Usually a slit is located close to the moving fabric and each time the weft thread crosses the slit a pulse is generated. The frequencies of the pulses from the plurality of stations are compared in a complex electronic system and an output signal is produced which is either displayed to an operator who then manually controls a device which makes bow and selvedge corrections just prior to rolling up the fabric or the signal is used to automatically control a similar device.

A large variety of fabrics, such as twill, have a diagonal periodic structure which causes erroneous signals. Certain printed patterns also have this effect. The different speeds at which various fabrics are processed result in different frequency outputs from the prior art detectors adversely affecting their response and increasing the cost and complexity of the comparing circuitry. The illuminating slits of these prior art detectors must be opened or closed to match the diameter of the weft in the fabric being processed. The slits are located close to the cloth and often become clogged with lint. When the path of the cloth moves toward and away from the slits, as often occurs, erroneous readings are produced. Thus, prior art weft misalignment detectors are cumbersome and unreliable. Furthermore, knitted goods which have in the past few years become an increasingly large portion of the total textile output cannot be processed in existing apparatus.

Thus, there is a need for a weft alignment detector which is essentially contactless, not adversely affected by the textile weaving and processing environment, and which does not require calibration for processing widely varying types of fabrics.

Similarly there is a need for such apparatus for observing, detecting and correcting periodic structures in other moving webs, such as nonwoven feltlike fabrics, paper, plastic, sheet metal and the like.

It is therefore a principal object of the invention to provide a method and apparatus for observing periodic structures in a moving web.

Another object of the invention is to provide a method and apparatus of the above character for detecting deviations from a norm in the periodic structure.

Still another object of the invention is to provide a method and apparatus of the above character for correcting such deviations.

Yet another object of the invention is to provide a method and apparatus of the above character requiring no contact with the moving web.

A further object of the invention is to provide a method and apparatus of the above character which is not adversely affected by the environment of the moving web being observed.

Another object of the invention is to provide a method and apparatus of the above character producing signals which are capable of simple processing and interpretation.

Still another object of the invention is to provide a method and apparatus of the above character in which a single isolated characteristic of the periodic structure of the moving web may be observed irrespective of widely varying other characteristics of the moving web.

A further object of the invention is to provide a method and apparatus of the above character in which the frequency or wavelength of the periodic structure may also be determined.

A still further object of the invention is to provide a method and apparatus of the above character for detecting and correcting weft misalignments and for counting weft threads in a moving cloth web.

Other objects of the invention will in part be obvious and will in part appear hereinafter.

The invention accordingly comprises several steps and the relation of one or more of such steps with respect to each of the others, and apparatus embodying features of construction, combinations of elements and arrangement of parts which are adapted to effect such steps, all as exemplified in the following detailed disclosure. The scope of the invention is indicated in the claims.

THE DRAWINGS

For a fuller understanding of the nature and objects of the invention, reference should be had to the following detailed description taken in connection with the accompanying drawings, in which:

FIG. 1 is a side view, partially in diagrammatic form, of fabric misalignment detecting and correcting apparatus according to the invention;

FIGS. 2A, 2B and 2C are diagrammatic views of cloth having weft distortion which may be corrected by means of the method and apparatus of the invention;

FIG. 3 is a diagram of an optical system illustrating the principals of the invention;

The same reference characters refer to the same elements throughout the several views of the drawings.

SPECIFIC DESCRIPTION

Figure 4:
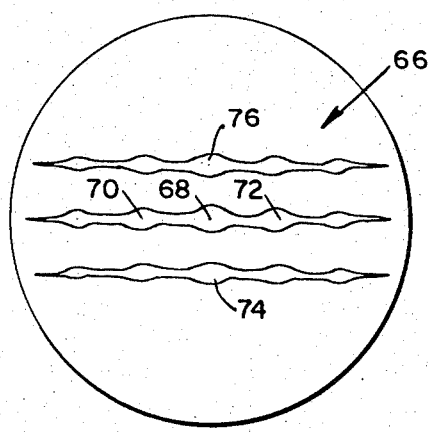
FIG. 4 is a representation of the diffraction pattern produced by the optical system of FIG. 3.

Now referring to FIG. 1 wherein apparatus according to the invention is shown in generally diagrammatic form, a moving fabric web 12 is unrolled from a roll 14 and passes through processing apparatus 16. The web 12 is then fed to an existing mechanical device 18 for making bow and selvedge corrections. Such devices 18 may be manually controlled or automatically controlled.

Before passing through apparatus 18 the fabric passes through apparatus according to the invention, generally indicated at 20, and is rolled up onto roll 22. The apparatus 20 according to the invention is mounted to rigid support structure 24 to one side of the fabric web 12. A source of radiation 26 is located adjacent to the web 12 and the radiation passes therethrough to detector and control signal producing apparatus 28. The detector and control signal producing apparatus 28 may produce an electrical signal on line 30 supplied to readout apparatus 32 for observation by a human operator 34. The human operator may then control the correcting apparatus 18 by means of control box 36. Alternatively the detecting and control apparatus may produce automatic control signals on line 38 which are supplied directly to automatic correcting apparatus 18.

In FIGS. 2A, 2B and 2C there is illustrated typical weft misalignments. In FIG. 2A the weft threads 40 are skewed with respect to the warp threads 42. In FIG. 2B the weft threads 40 are bowed with respect to the warp threads 42. And, in FIG. 2C "S" distortion of the weft 40 with respect to the warp 42 is shown.

Now referring to FIG. 3 wherein a generalized optical system of the method and apparatus of my invention is shown, a light source 44 is located behind a color filter 46 and a ground glass diffusing screen 48. Substantially monochromatic light is therefore allowed to fall on a slit or pinhole in diaphragm 50. This light is collimated by collimating lens 52 and illuminates the moving web 54. Light, generally indicated at 56 by dotted lines having been diffracted by passing through the moving web is focused by means of lens 58 to form the Fraunhofer diffraction image of the moving web 54 at the diffraction image plane 60. The image is enlarged by lens 62 and reimaged at the plane of detection 64. As will be understood by those skilled in the art, when the opening in diaphragm 50 is a slit the diffraction pattern formed at image planes 60 and 64 is modified. The purpose of this modification will become apparent from the discussion below.

As is also understood by those skilled in the art, all that is necessary to form the diffraction pattern at planes 60 and 64 is illumination of the web 54 with spatially coherent radiation. Substantially monochromatic illumination which is fairly well collimated has this property and may be achieved by use of the collimating lens 52 or by locating the light source at a large distance from the moving web 54. The spatially coherent illumination may under certain circumstances be advantageously provided by the use of a laser.

The diffraction pattern observed at diffraction image planes 60 and 64 is diagrammatically shown in FIG. 4. The diffraction pattern 66 shown in FIG. 4 comprises a central maximum 68 of undiffracted light, horizontally aligned first order maxima 70 and 72 of diffracted light spaced apart in accordance with the warp thread density measured in threads per unit length. The warp is aligned vertically and the weft horizontally as in FIGS. 2A, 2B and 2C. Vertically aligned first order maxima 74 and 76 are spaced apart proportional to the weft thread density. Higher order maxima are also shown. To produce the pattern 66 of FIG. 4, the opening in diaphragm 50 (FIG. 3) is a slit aligned with the weft. Its effect is to smear the maxima in a direction aligned with the slit and the weft. My invention depends upon the fact that the amplitude and thus the brightness of the diffraction image of FIG. 4 is unaffected by the speed of the fabric web 54 shown in FIG. 3.

It will be understood by those skilled in the art that other characteristics of the cloth web 54 may be determined from the diffraction pattern 66, such as thread thickness, which is proportional to the intensity ratios of the subsequent diffraction orders and fabric structures, such as sateen and twill, which will produce characteristic distortions in the normal diffraction pattern shown in FIG. 4. Furthermore, alignment of the fabric may be determined, in that the diffraction pattern 66 will rotate to the same angle as the fabric 54 is rotated. When the weft is misaligned, the diffraction pattern 66 will be skewed through the same angle.

Figure 5:
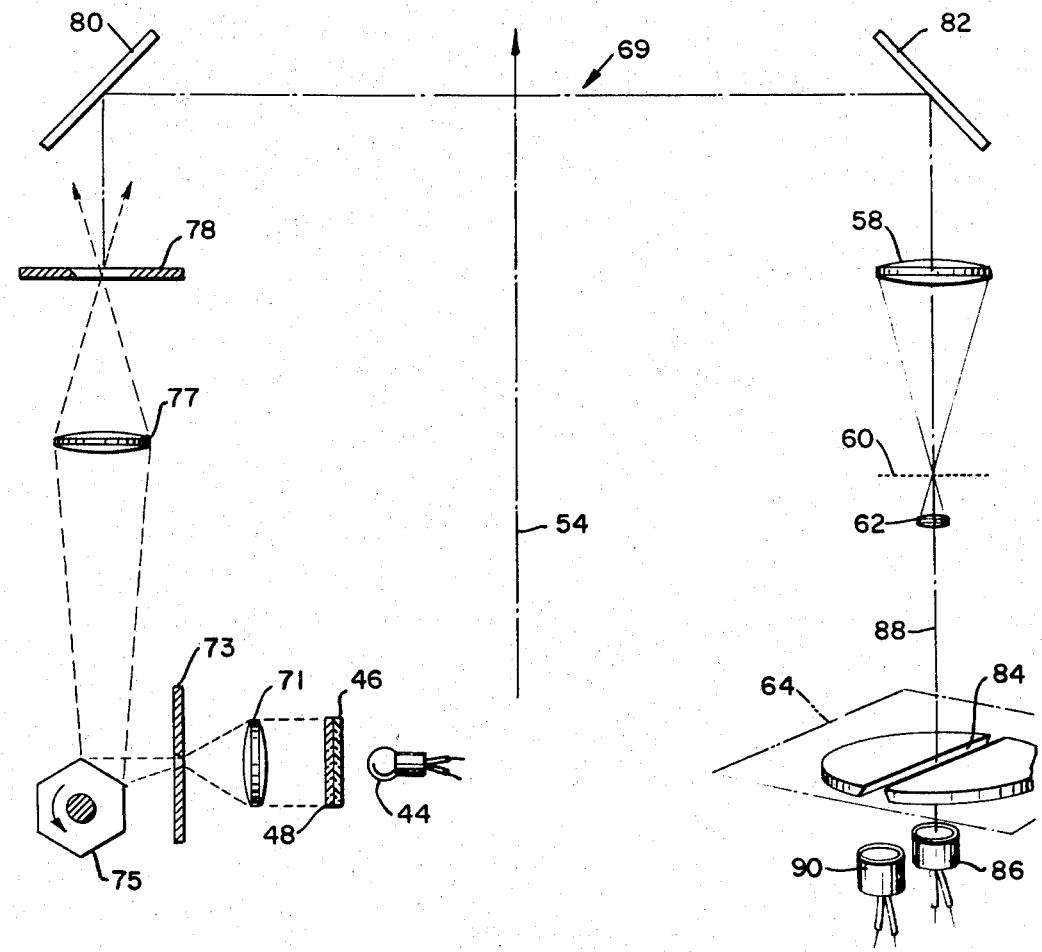
FIG. 5 is a diagram of the optical system of the apparatus of FIG. 1.

An optical system generally indicated at 69 in FIG. 5 is capable of detecting this angular misalignment of the weft. The moving fabric web 54 passes through the system as shown. Light source 44 illuminates filter 46 and ground glass diffuser 48. The light therefrom is concentrated by lens 71 on slit 73. The rotating multifaceted mirror 75 causes light from the slit 73 to be repeatedly swept across lens 77 which focuses an oscillating image of slit 73 at sweep limiting slit 78. The oscillation is needed only for obtaining an electric alternating current signal, not for visual display. The light passing through slit 78 is reflected at mirror 80, through the fabric 54 and reflected by mirror 82 to the diffraction image forming lens 58. The diffraction pattern produced at plane 60 is enlarged by lens 62 and focused on a slit 84 parallel to slit 73 and shown in perspective in FIG. 5. Photocell 86 is located on the optical axis 88 to receive the light from the central maximum of undiffracted light 68 shown in FIG. 4 and photocell 90 is located to receive light from one of the first order maxima 70 or 72 produced by the average fabric processed by the machine.

As previously stated, for detecting weft alignment one is interested in orientation of the diffraction pattern only. In order to measure with the same photo-optic detectors, fabric of different warp densities, one, therefore, best produces the pattern in such a way that the individual diffraction orders appear oblong enough to overlap one another (as in FIG. 4) rather than circular. This can be done either by using a slit 73 for illumination or by using a cylinder lens (for example, lens 62). The dimensions of the cylinder lens are such that, for the occurring thread densities, the oblong diffraction orders always overlap as in FIG. 4.

Similarly, rather than oscillating the slit 73, the pattern could be oscillated by oscillating the cylindrical lens or the slit 84 and detectors 86 and 90 could be oscillated with respect to a stationary image of the diffraction pattern.

Those skilled in the art will also understand that in order to produce a bright diffraction pattern the diffracted light collecting lens 58 should be as close to the fabric 54 as possible. However, this distance is not critical, and the larger the diameter of lens 58, the farther away it may be.

Those skilled in the art will also realize that the slit 78 limits the scanning such that the diffraction pattern 66 imaged at the slit 84 oscillates up and down less than the distance between the first order vertical maxima 74 and 76. Thus, the crossing of the central maximum 68 across the slit 84 will produce a reference pulse in photodetector 86 and the time of passage of the first order maximum 70 across the slit 84 detected by the photodetector 90 will be an indication of the amount of skew in the weft. If there is no misalignment, the two signals will be produced simultaneously. The time difference between the two signals will be proportional to the skew angle.

Figure 6:
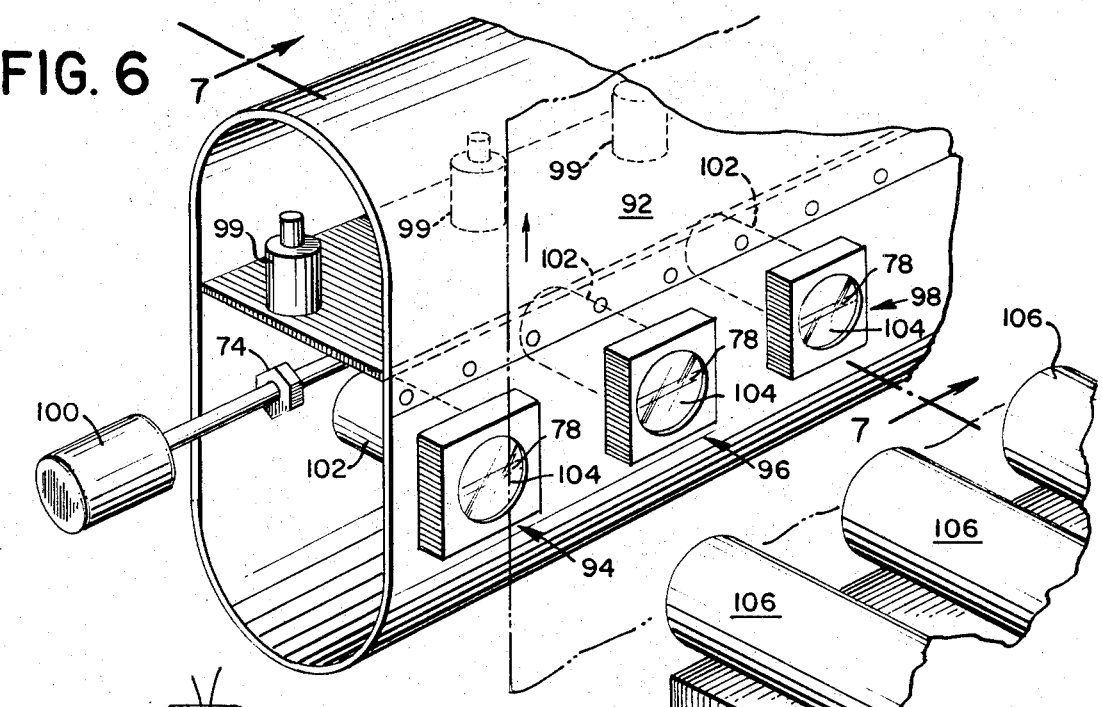
FIG. 6 is a detailed perspective view, partially cutaway, of a portion of the apparatus of FIG. 1.
Figure 7:
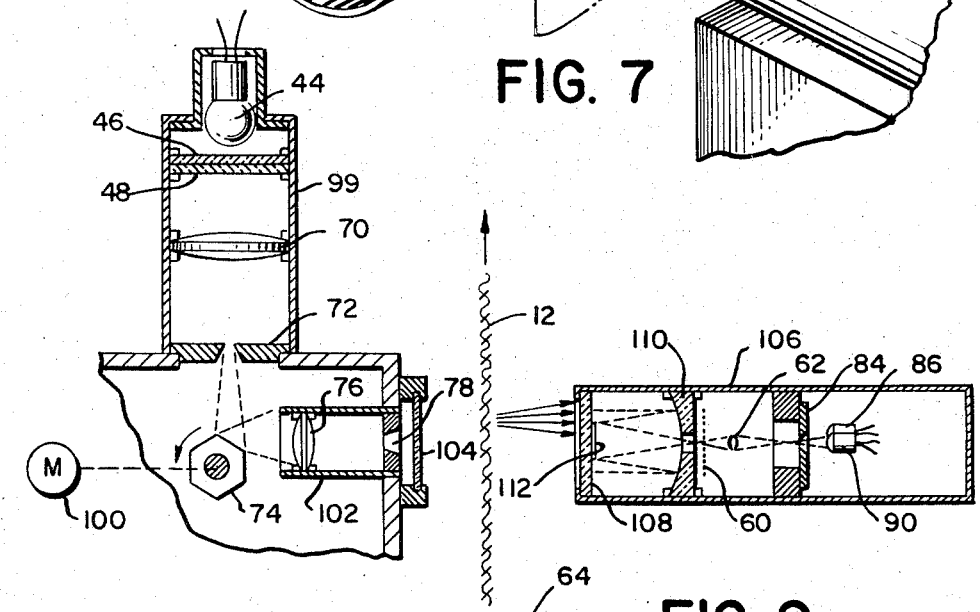
FIG. 7 is a detailed cross-sectional view of a portion of the apparatus of FIG. 1 taken along the line 7—7 of FIG. 6.

The apparatus 20 shown in FIG. 1 utilizes the optical system shown in FIG. 5 and is shown in greater detail in FIGS. 6 and 7. Referring to FIGS. 5 and 6, housing 92 is rigidly mounted to support 24 (shown in FIG. 1). A plurality of alignment detector illuminators are located across the width of the fabric as generally indicated at 94, 96 and 98. Each illuminator comprises lamp 44, filter 46 (which may be a Wratten), ground glass 48, lens 70 and slit 12 mounted in housing 99. The motor 100 drives a plurality of multifaceted mirrors 74. Lens 76 and slit 78 at each station are mounted in a housing 102 and the whole is protected from the intrusion of dust by means of glass plates 104. It will be noted that the mirrors 80 and 82 are not used in the system of FIGS. 6 and 7.

As shown in detail in FIG. 7, the collecting optics of each station rather than being a simple lens 58 may be a Cassegrainian system mounted in a housing 106. This system comprises protective glass plate 108, collecting mirror 110, reflecting mirror 112 forming the diffraction pattern at image plane 60, magnifying lens 62, slit 84 and detectors 86 and 90.

Figure 8:
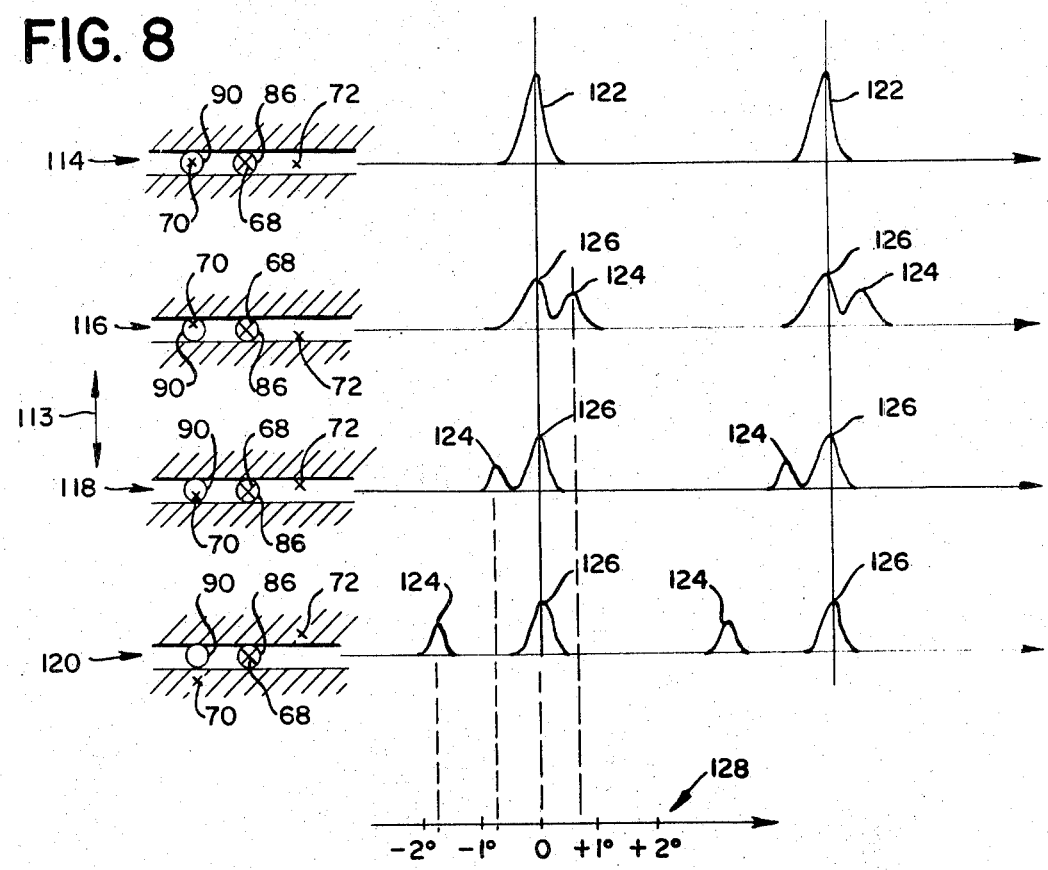
FIG. 8 is a diagram illustrating a principal of operation of the apparatus of FIGS. 5 through 7.

The relationship between weft alignment and the signals produced by the photodetectors 86 and 90 is illustrated in FIG. 8. On the left the slit 84 is shown. The diffraction pattern oscillates up and down as shown at 113 with respect to the slit 84. This may be at a frequency of 35 cycles per second, for example.

The patterns for perfect weft alignment 114, a small amount of clockwise rotation 116, a small amount of counterclockwise rotation 118 and a large amount of counterclockwise rotation 120 are shown. The positions of the photodetectors are indicated by circles 90 and 86 and the maxima of the diffraction pattern 66 illustrated in FIG. 4 are indicated by X's 68, 70 and 72.

The electrical signals provided by the photocells 86 and 90 at each alignment condition are illustrated on the right of FIG. 8. In perfect alignment the two signals occur simultaneously and if they are added together as shown in FIG. 8, a maxima 122 is produced each time the maxima 68 and 70 cross the slit 84. A small amount of clockwise misalignment will cause the first order maximum 70 to cross the slit and photocell 90 before the zero order maximum 68 crosses the photocell 86. Thus a small intensity peak 124 from the photocell 90 will precede a larger intensity peak 126 from the photocell 86 each time the pattern crosses the slit 84.

Similarly for counterclockwise misalignment the zero order maximum 68 will cross photocell 86 before the first order maximum 70 crosses the photocell 90. Thus, the large amplitude pulse 126 will precede the small amplitude pulse 124. Larger misalignments will cause a greater time difference between receipt of the two pulses 124 and 126. Thus, as shown at 120, for a large counterclockwise misalignment, maximum 126 will occur quite a long time before maximum 124.

As will be understood by those skilled in the art, the signals illustrated in FIG. 8 may be displayed on an oscilloscope either on the same line or on different lines on a dual-trace oscilloscope. A scale, such as generally indicated at 128, may be provided of, for example, degrees of misalignment, as shown. Thus, referring to FIG. 1, the display 132 may be such an oscilloscope.

Furthermore, the time difference between the pulses 124 and 126 from the several stations 94, 96, 98 may be compared and converted to appropriate control signals supplied to automatic correcting apparatus 18 on lines 38 as shown in FIG. 1.

It will be understood that the apparatus illustrated in FIGS. 5–8 produces an analog output signal. That is, the signal is an analog function (time) proportional to the angular misalignment of the weft. In many cases it is desirable to provide a digital signal. Apparatus for doing this is illustrated in FIG. 9.

Figure 9:
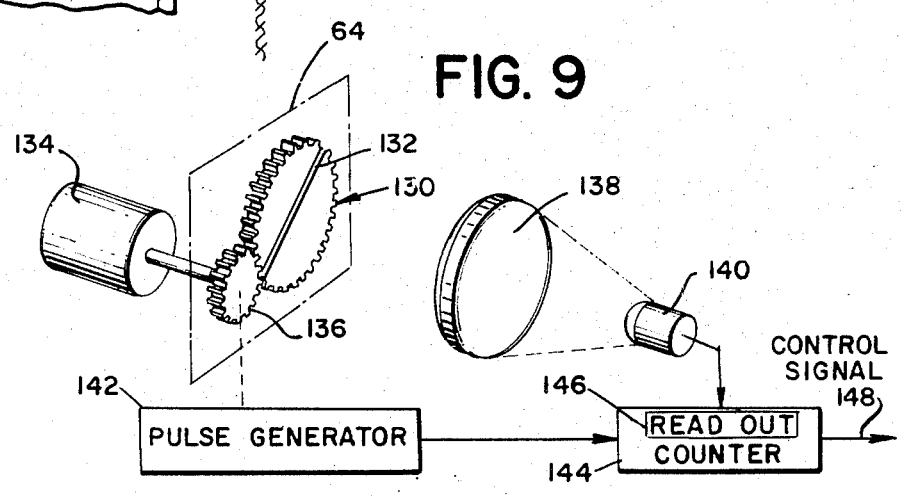
FIG. 9 is an optical and electrical schematic diagram of a detector for use in the optical system illustrated in FIG. 3 for producing a digital output; and, FIG. 10 is a diagram of an alternative form of detector for use in the optical system of FIG. 3.

In FIG. 9 apparatus for observing the diffraction pattern produced as shown in FIG. 3 is generally indicated at 130. As shown in FIG. 9, a slit 132 at the diffraction image plane 64 is rotated by means of a motor 134 through a gear 136. Light passing through the rotating slit 132 is collected by lens 138 and falls on photodetector 140. When slit 132 is aligned with the zero order maximum 68 and the first order maxima 70 and 72, a maximum amount of light will fall on the photodetector 140. The orientation of the slit 132 at this time is then the same as the weft. This angle may be determined by means of a pulse generator or angular encoder 142 producing pulses corresponding to fixed interval angular rotations of the slit 132. The pulses are counted by control circuitry 144 from the time the slit 132 is at a zero angular position until the maximum signal is produced by photodetector 140. Thus, a digital readout 146 may be provided or a digital signal on line 148.

Figure 10:
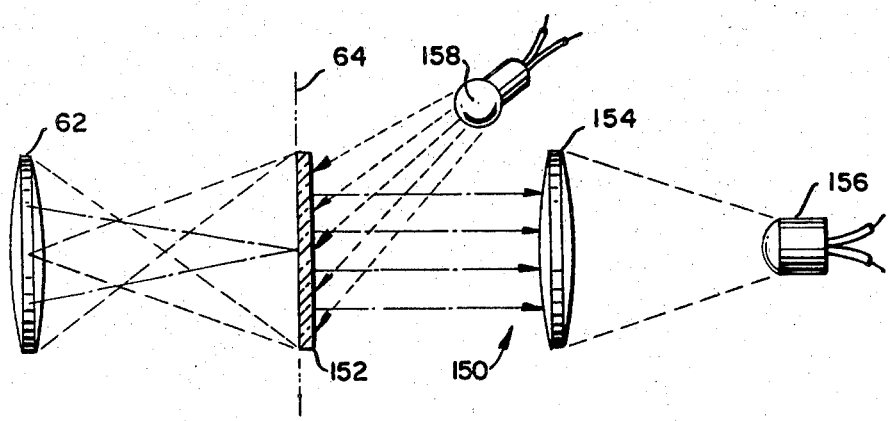

Another form of deviation detector is generally indicated at 150 in FIG. 10. It comprises a photochromic sheet 152 located at the diffraction plane 60 or 64 in FIG. 3. Photochromic sheet 152 darkens when exposed to the illumination from light source 44. The light forming the diffraction image will cause the photochromic detector 152 to become opaque in a pattern exactly corresponding thereto. Thus, a perfectly periodic web will produce an invarying diffraction pattern and after a certain amount of time depending on the response time of the photochromic material 152, no light will be collected by collecting lens 154 and no light will fall on photodetector 156. If a defect occurs in the periodic structure, the diffraction pattern will shift and some light will pass through photochromic sheet 152. This light will be detected by photodetector 156 indicating the presence of a defect. As most photochromic materials are darkened by ultraviolet light, light source 44 supplies such illumination in this embodiment of the invention. The darkening of the photochromic detector caused by the deviated diffraction pattern may be bleached out by illuminating the same with light from an infrared source 158 as infrared light bleaches the photochromic material 152. This will quickly bleach darkenings caused by deviations occurring for a short time. The infrared and ultraviolet sources may be interchanged in which case deviations would decrease the amount of radiation reaching the detector 156 rather than increasing it.

Again referring to FIG. 3, the periodicity of the structure passing through the apparatus of the invention may be detected by combining reference interfering light with light forming a diffraction maximum. As will be understood by those skilled in the art, this is because the phase of the light forming each diffraction maximum changes in synchronism with the passage of the periodic structure while the amplitude thereof remains unchanged. This phase may be detected by interference with a beam of light having a fixed reference phase. One way to produce this is to use the half-silvered mirrors 158 and 160 shown in FIG. 3. Mirror 158 produces a reference beam which may be guided by mirrors 162 and 164, focused by lens 166, and directed by half-silvered mirror 160 onto one of the diffraction maxima at plane 64. The light amplitude variations resulting from the interference of the two beams may then be detected by photodetector 90. In this manner, for example, the speed of the moving fabric 54 may be determined from the number of weft threads counted.

It should be understood that the reference beam of FIG. 3 need not be extracted directly from the illuminating light source if, for example, two synchronized sources, such as lasers, are used, one as the illuminating source and one as the source of the reference beam.

It will thus be seen that one aspect of my invention is the observation of the characteristics of a moving web by means of observing the diffraction pattern formed by the moving web. Although the pattern is formed in the apparatus hereinbefore disclosed by passing the radiation through the moving web, the diffraction pattern may also be formed by reflecting the radiation from the moving web without departing from the principals of my invention. One advantage of my method is that the information detected depends upon the average characteristics of the web over the entire relatively large area illuminated. Thus, short term variations may be ignored and large movements of the web towards and away from the illuminating source or the detector are not significant. Furthermore, no changes in the illuminator or calibrations of the detector need be made even for large variations in the characteristics of the moving web.

While the specific moving web disclosed herein is textile fabric, the invention is also applicable to other moving webs having periodic structures. Similarly, while for the sake of simplicity I have discussed woven fabrics, the invention is particularly applicable to knitted fabrics. Warp and weft as used herein therefore also refer to the corresponding orthogonally aligned threads or structures of knitted fabrics.

While the illuminating radiation disclosed herein is light, it will be understood that other radiation, such as X-rays, ultrasonic rays, microwaves, or the like, may also be used together with appropriate monochromatizing, diffracting, focusing and detecting elements.

Although in one embodiment of the invention I have disclosed phototropic material, it should be understood that other forms of radiotropic material might be used in combination with any appropriate detector of the radiation as affected by the radiotropic material.

It will thus be seen that the objects set forth above, among those made apparent from the preceding description, are efficiently attained and, since certain changes may be made in carrying out the above method and in the constructions set forth without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. The method of detecting deviations in a moving web from a norm comprising the steps of:
   A. illuminating the moving web with spatially coherent radiation;
   B. forming a diffraction image of the web in radiotropic material with the illuminating radiation which has interacted with said web; and,
   C. detecting temporal changes in radiation which has interacted with said material.

2. The method defined in claim 1 wherein said illuminating radiation consists of a first frequency band and said radiotropic material produces opposite radiotropic responses to radiation of said first frequency band and radiation of a second frequency band differing from said first frequency band; and the additional step of:
   D. illuminating said radiotropic material with radiation of said second frequency band.

3. The method defined in claim 2 wherein said material is phototropic, said illuminating radiation is infrared light, and said second frequency band is ultraviolet light.

4. The method defined in claim 2 wherein said material is phototropic, said illuminating radiation is ultraviolet light, and said second frequency band is infrared light.

5. The method of detecting deviations in a moving web from a norm comprising the steps of:
   A. illuminating the moving web with spatially coherent radiation;
   B. forming a diffraction image of the web with the illuminating radiation which has interacted with said web;
   C. additionally illuminating said diffraction image with radiation comprising a reference phase component; and,
   D. detecting the temporal interference pattern formed by said additional radiation and said diffraction image.

6. Apparatus for observing a characteristic of a periodic structure of a moving web comprising:
   A. a source of spatially coherent illumination for illuminating a stationary area through which the web passes;
   B. an optical system for forming a diffraction image of said web;
   C. means for combining at least one diffraction order of said diffraction image with reference illumination coherent therewith; and,
   D. a detector responsive to the time amplitude interference pattern produced thereby.

7. Apparatus for observing a characteristic of a periodic structure of a moving web comprising:
   A. a source of spatially coherent illumination for illuminating an area through which the web passes;
   B. an optical system for forming with said illumination a diffraction image of said web;
   C. a detector for detecting rotation of said diffraction image comprising:
      a. a slit at said diffraction image rotating about an axis passing through the zero diffraction order,
      b. a photodetector on said axis for receiving the light forming the diffraction image passing through said slit and for producing a signal in response thereto,
      c. reference signal producing means synchronized with said rotating slit, and
      d. means for producing a signal proportional to the phase difference between said reference signal and said photodetector signal.

8. Apparatus as defined in claim 7 wherein said phase difference signal producing means comprises a counter which starts counting upon receipt of said reference signal and stops counting upon the attainment of a predetermined amplitude in said photodetector signal.

9. Apparatus as defined in claim 7 wherein said source of illumination comprises a slit.

10. Apparatus as defined in claim 7 wherein said source of illumination comprises a cylindrical lens.

11. Apparatus for observing a characteristic of a periodic structure of a moving web comprising:
   A. a source of spatially coherent illumination for illuminating an area through which the web passes;
   B. an optical system for forming with said illumination a diffraction image of said web;
   C. a slit on which said image is formed; and,
   D. a detector for detecting movement of said diffraction image with respect to said slit comprising a first photodetector located to receive the undiffracted light passing through said slit and for producing a signal in response thereto, and a second photodetector located to receive diffracted light passing through said slit to one side of the undiffracted light and for producing a signal in response thereto, and means for oscillating said image with respect to said slit.

* * * * *